United States Patent
Baxendale et al.

(10) Patent No.: US 10,907,604 B2
(45) Date of Patent: Feb. 2, 2021

(54) INTEGRATION OF STARTER CURRENT CONTROL DEVICE AND ON-BOARD ELECTRICAL SYSTEM DISCONNECTING SWITCH

(71) Applicant: Daimler AG, Stuttgart (DE)

(72) Inventors: Mark Baxendale, Weil im Schoenbuch (DE); Dieter Grohmann, Gechingen (DE); Christian Seitz, Herrenberg (DE); Markus Woerz, Leonberg (DE); Klaus Zinser, Gaertringen (DE)

(73) Assignee: Daimler AG, Stuttgart (DE)

( * ) Notice: Subject to any disclaimer, the term of this patent is extended or adjusted under 35 U.S.C. 154(b) by 399 days.

(21) Appl. No.: 15/743,126

(22) PCT Filed: Jul. 2, 2016

(86) PCT No.: PCT/EP2016/001135
§ 371 (c)(1),
(2) Date: Jan. 9, 2018

(87) PCT Pub. No.: WO2017/005355
PCT Pub. Date: Jan. 12, 2017

(65) Prior Publication Data
US 2019/0101091 A1    Apr. 4, 2019

(30) Foreign Application Priority Data
Jul. 9, 2015   (DE) .................. 10 2015 008 881

(51) Int. Cl.
*F02N 11/08*   (2006.01)
*B60R 16/03*   (2006.01)

(52) U.S. Cl.
CPC .......... *F02N 11/0862* (2013.01); *B60R 16/03* (2013.01); *F02N 11/087* (2013.01);
(Continued)

(58) Field of Classification Search
CPC ..... F02N 2011/0874; F02N 2011/0877; F02N 2011/0881; F02N 2250/02
See application file for complete search history.

(56) References Cited

U.S. PATENT DOCUMENTS 2,376,658 A * 5/1945 Charbonneau ....... H01H 71/685
361/31
6,104,157 A * 8/2000 Kramer ............... F02N 11/0851
318/430
(Continued)

FOREIGN PATENT DOCUMENTS

CN   102246387 A   11/2011
CN   103154498 A   6/2013
(Continued)

OTHER PUBLICATIONS

Japanese Notification of Reason for Refusal issued in Japanese counterpart application No. 2017-568347 dated Nov. 5, 2019, with English translation (Five (5) pages).
(Continued)

*Primary Examiner* — Kevin R Steckbauer
(74) *Attorney, Agent, or Firm* — Crowell & Moring LLP

(57) ABSTRACT

An integrated starter and on-board electrical system disconnecting module for connecting to a starter battery and to an on-board electrical system by a transducer is disclosed. A method for limiting the starting current in a motor vehicle and the use of the integrated starter and on-board electrical system disconnecting module in multi-voltage on-board electrical systems, in particular during a start-stop operation of plug-in hybrid vehicles and for hybrid on-board electrical systems, are also disclosed. The transducer can be connected to a starter circuit including the starter battery from an on-board electrical system side, via a starter control device and via an on-board electrical system disconnector. The on-board electrical system can be uncoupled from the starter
(Continued)

circuit and the starter control device and the on-board electrical system disconnector are integrated in the module.

3 Claims, 2 Drawing Sheets

(52) U.S. Cl.
CPC .............. *F02N 2011/0874* (2013.01); *F02N 2011/0877* (2013.01); *F02N 2011/0888* (2013.01); *F02N 2250/02* (2013.01)

(56) References Cited

U.S. PATENT DOCUMENTS

| | | | |
|---|---|---|---|
| 6,304,054 B1 | 10/2001 | Granberg et al. | |
| 6,329,796 B1* | 12/2001 | Popescu | H02J 7/0031 320/134 |
| 7,236,893 B2* | 6/2007 | Gross | B60L 50/16 702/57 |
| 9,240,704 B2* | 1/2016 | Wortberg | H02J 7/1423 |
| 9,441,600 B2* | 9/2016 | Klinkig | F02N 11/0818 |
| 9,527,462 B2* | 12/2016 | Klinkig | B60R 16/03 |
| 9,682,672 B2* | 6/2017 | Tofilescu | H03K 17/0822 |
| 9,860,986 B2* | 1/2018 | Tazarine | H05K 1/0287 |
| 10,465,645 B2* | 11/2019 | Sierak | H02J 7/0036 |
| 2005/0267697 A1* | 12/2005 | Gross | B60L 58/20 702/64 |
| 2010/0308647 A1* | 12/2010 | Fluhrer | H02J 1/14 307/9.1 |
| 2011/0012424 A1* | 1/2011 | Wortberg | H02J 7/1423 307/10.1 |
| 2013/0264869 A1* | 10/2013 | Klinkig | F02N 11/087 307/10.6 |
| 2015/0076899 A1* | 3/2015 | Tofilescu | B60R 16/033 307/9.1 |
| 2015/0084345 A1* | 3/2015 | Klinkig | B60R 16/03 290/38 E |
| 2017/0094790 A1* | 3/2017 | Tazarine | H05K 1/14 |

FOREIGN PATENT DOCUMENTS

| | | |
|---|---|---|
| CN | 103339370 A | 10/2013 |
| CN | 104271404 A | 1/2015 |
| CN | 104662285 A | 5/2015 |
| DE | 699 35 831 T2 | 8/2007 |
| DE | 10 2008 054 706 A1 | 6/2010 |
| DE | 10 2009 028 294 A1 | 2/2011 |
| DE | 10 2009 058 362 A1 | 6/2011 |
| DE | 10 2010 040 751 A1 | 3/2012 |
| DE | 10 2010 042 802 | 4/2012 |
| DE | 10 2011 101 531 A1 | 11/2012 |
| DE | 10 2012 000 624 A1 | 7/2013 |
| DE | 10 2012 009 738 A1 | 11/2013 |
| DE | 10 2012 219 580 | 4/2014 |
| DE | 10 2012 222 208 A1 | 6/2014 |
| EP | 2 469 070 A1 | 6/2012 |
| JP | 11-324873 A | 11/1999 |
| JP | 2005-533702 A | 11/2005 |
| JP | 2012-46127 A | 3/2012 |
| JP | 2014-518806 A | 8/2014 |
| JP | 2015-512010 A | 4/2015 |
| WO | WO 03/105330 A2 | 12/2003 |
| WO | WO 2012/076123 A1 | 6/2012 |
| WO | WO 2014/064148 A1 | 5/2014 |

OTHER PUBLICATIONS

Japanese Notification of Reason for Refusal issued in Japanese counterpart application no. 2017- 568347 dated Jan. 22, 2019, with partial English translation (Five (5) pages).

Chinese Office Action issued in Chinese counterpart application no. 201680040199.8 dated Jun. 13, 2018, with partial English translation (Eleven (11) pp.).

PCT/EP2016/001135, International Search Report dated Oct. 17, 2016 (Three (3) pages).

* cited by examiner

INTEGRATION OF STARTER CURRENT CONTROL DEVICE AND ON-BOARD ELECTRICAL SYSTEM DISCONNECTING SWITCH

BACKGROUND AND SUMMARY OF THE INVENTION

The invention relates to an integrated starter and on-board electrical system disconnecting module for connecting to a starter battery and to an on-board electrical system by a transducer, and a method for limiting the starting current in a motor vehicle. The invention further relates to the use of the integrated starter and on-board electrical system disconnecting module in multi-voltage on-board electrical systems, in particular during the start-stop operation of plug-in hybrid vehicles and for hybrid on-board electrical systems.

In hybrid vehicles, starting the combustion motor when driving electrically is often accomplished by the known 12-volt starter motor. The electric machine can use its torsional moment to its full extent as an electrical drive, and the additional moment is provided from a second energy source for rotating the combustor. A problem here is that the 12-volt on-board electrical system supply is interrupted by the starting process and a voltage drop takes place. The starter circuit must be disconnected from the on-board electrical system and the on-board electrical system is supplied via an additional energy source, in general via a transducer that provides an energy supply from the drive battery. If this energy source suddenly fails, a redundant supply must secure the on-board electrical system in order to guarantee safety functions such as lights, steering, etc. Usually, this takes place by means of an auxiliary battery, wherein the interconnection of auxiliary battery, transducer and starter battery is very complex and laborious.

Several individual modules for carrying out the functions when disconnected are known from the prior art, wherein additional auxiliary batteries or a redundant supply through the DC-DC transducer are required. In the event of a failure of the on-board electrical system supply or the transducer when the combustor is starting, the start has to be terminated and the vehicle brought to an emergency stop by the electric motor.

A vehicle having a combustion motor and an on-board electrical system is known from WO 2014/064148 A1, wherein the vehicle comprises a battery, a current distributor, a starter, a generator and electrical consumers. A starting current limiting device for start-stop operation is described herein.

Furthermore, EP 2 469 070 A1 can be referred to as further prior art. In this printed publication, a motor vehicle on-board electrical system and a starting method for a motor vehicle are described, in which an excessive voltage drop of the battery during the starting process is prevented by the current consumption of the starter being limited in a time-restricted manner by a bridgeable series resistor. The time restriction depends on parameters determined and evaluated in real time. Usually, the high current consumption of the starter results in measures for voltage support in the on-board electrical system which compensate for the drop of the voltage in the on-board electrical system. In this printed publication, the integration of a series resistor for limiting the starter current takes place. However, the known current limitations only ever consider partial electrical systems or single-voltage on-board electrical systems.

The object of the present invention is to provide a means for starting current limitations in multi-voltage on-board electrical systems, wherein the potential of multi-voltage on-board electrical systems can be made accessible by an improved starting current limitation in order to also start from batteries with different voltage layers and different load behaviors.

According to a first aspect of the invention, this object is solved by an integrated starter and on-board electrical system disconnecting module for connecting to a starter battery and to an on-board electrical system by a transducer, wherein the transducer can be connected from an on-board electrical system side to a starter circuit comprising the starter battery via a starter control device and via an on-board electrical system disconnector. According to the invention, the on-board electrical system can be uncoupled from the starter circuit and the starter control device and the on-board electrical system disconnector are integrated in the module.

It is an idea of the invention to enable a start from different partial on-board electrical systems. As a result of a corresponding selection of the suitable potential branch, the starter circuit can be optimally supplied with current, corresponding to the load behavior of the connected energy source. Advantageously, an overcurrent protection for the starter circuit can be implemented when it is started from an energy source with a very low internal resistance, such as from a lithium high voltage battery, for example.

According to a preferred exemplary embodiment of the invention, the starter control device comprises a starter switch for switching on a starter motor, wherein the starter motor is electrically coupled to the starter battery, such that the starter motor and the starter battery can be disconnected from the on-board electrical system during a starting process. Correspondingly, the on-board electrical system and the starter circuit can be uncoupled and coupled as needed. The on-board electrical system disconnector preferably comprises an on-board electrical disconnecting switch, wherein the starter switch and/or the on-board electrical system disconnecting switch is/are formed as MOSFET having intrinsic diodes. Preferably, starter switches and on-board electrical system disconnecting switches are switched in parallel to one another.

According to another preferred exemplary embodiment of the invention, a first quasi-diode is provided which is closed in its base state, wherein, during a starting process, the first quasi-diode is opened and a voltage monitoring relative to the on-board electrical system takes place. Correspondingly, the first quasi-diode can be integrated in the module. Furthermore, the on-board electrical system can thus be monitored, and a measure can be initiated at any time as needed. Preferably, a control unit is provided which is connected to the first quasi-diode, wherein the control unit switches through the first quasi-diode and terminates the starting process in the event of falling below a predetermined voltage drop on the on-board electrical system side or the transducer failing. Advantageously, the control unit can thus react to voltage drops or transducer failures. Preferably, a series resistor is provided which is switched in series with the starter switch, wherein the series resistor can be electrically connected to the first quasi-diode from a starter circuit side. A second quasi-diode is preferably provided which is switched in series with the first quasi-diode. Correspondingly, two quasi-diodes are thus switched in series, wherein a voltage support point is preferably provided between the two quasi-diodes. Preferably, the second quasi-diode can also be controlled by the control unit. The two quasi-diodes can be advantageously integrated in the module by the starting current limitation. A voltage support point is preferably provided between the first quasi-diode and the second quasi-diode and/or a plurality of switchable potential taps are provided in the starter circuit. Preferably, the potential taps have different resistances. The starter control device and the on-board electrical system disconnector are preferably supplied by a common energy source, which provides an energy supply from the starter battery. Preferably, the common energy source is the transducer. The transducer is preferably formed as a DC-DC transducer and supplies the on-board electrical system during the starting process. Preferably, an electronic relay can further be integrated in the module.

According to a second aspect of the invention, the object is solved by means of a method for limiting the starting current in a motor vehicle, wherein a transducer is connected to a starter circuit from an on-board electrical system side via a starter control device and via an on-board electrical system disconnector. According to the invention, the on-board electrical system is uncoupled from the starter circuit during a starting process and the starter control device and the on-board electrical system disconnector are integrated in a module.

According to a preferred exemplary embodiment of the invention, both the starter circuit and the on-board electrical system are supplied by the starter control device.

According to a third aspect of the invention, the object is solved by the use of an integrated starter and on-board electrical system disconnecting module according to the first aspect of the invention in multi-voltage on-board electrical systems, in particular during a start-stop operation of plug-in hybrid vehicles and for hybrid on-board electrical systems.

It is an idea of the invention to integrate the starter control device and the on-board electrical system disconnector in a module. Furthermore, skillful control enables both the starter and the on-board electrical system supply to be ensured by only one 12-volt battery.

Advantageously, a simple integration by mounting on the battery terminal and saving an additional auxiliary battery or additional support transducer is made possible. The integration of the starter control device and on-board disconnecting switch enables a very quick switching sequence between separating the connection between battery and on-board electrical system and starting, i.e. a quick switching sequence between terminating the start and switching is ensured. The on-board electrical system disconnecting switch is preferably used for disconnecting the connection between battery and on-board electrical system depending on the current direction. Advantageously, a peak current limitation during the starting process and a start voltage drop limitation is possible. Furthermore, a direct mounting of the module on the battery terminal is possible. Further advantages are crash security, since a potential-free supply line to the starter circuit is enabled outside the immediate starting process, and an automatic stop of the start in the event of on-board electrical system supply problems during the starting process. The quasi-diode disconnects the starter circuit and the transducer, and nevertheless supplies the on-board electrical system in the event of voltage failure on the on-board electrical system side from the starter battery. As a result of a direct mounting on the battery, a simple integration is enabled and a weight and cost advantage also emerges. A cost advantage also emerges from not having to use an auxiliary battery that is otherwise necessary with the corresponding wiring. Furthermore, costs are saved by a mounting in an operating cycle being possible.

The invention is explained below in more detail by means of several preferred exemplary embodiments with reference to the drawings.

DETAILED DESCRIPTION OF THE DRAWINGS

Figure 1:
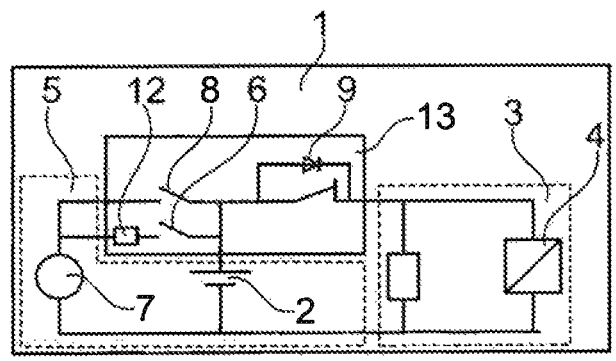
FIG. 1 illustrates an integrated starter and on-board electrical system disconnecting module according to a first exemplary embodiment of the invention.

As can be seen in FIG. 1, an integrated starter and on-board electrical system disconnecting module 13 having a connected starter battery 2 according to a first exemplary embodiment is depicted. The module 13 is connected on the on-board electrical system side by a transducer 4 that is located in the on-board electrical system 3. The transducer 4 can be connected to a starter circuit 5 including the starter battery 2 from the on-board electrical system side via the module 13. The connection takes place via a starter control device and via an on-board electrical system disconnector in the module 13. The on-board electrical system 3 can be uncoupled from starter circuit 5 and the starter control device and the on-board electrical system disconnector are integrated together in the module 13. Hybrid vehicles require a 12-volt start when travelling at high speeds. The voltage requirement of the steering and driving gear system requires uncoupling between the starter circuit 5 and the on-board electrical system 3.

In the event of the vehicle coming to a halt and operation of the vehicle without the starting process, uncoupling is not necessary. A quasi-diode 9 provided in the module 13 is closed in its base state. As soon as the vehicle picks up speed during the starting process, an uncoupling between the starter circuit 5 and the on-board electrical system 3 takes place. As a result, the quasi-diode switch 9 is opened. A voltage monitoring of the on-board electrical system 3 is active. The starter motor 7 is provided in the starter circuit 5 and the starter circuit 5 can be switched in series via a series resistor 12 by means of the quasi-diode 9. Here, a starter switch 6 is provided in the starter circuit 5 itself, the starter switch 6 being switched in series to the series resistor 12 and in parallel to an on-board electrical system disconnecting switch 8.

In the event of a voltage drop to a voltage less than 11 volts on the on-board electrical system side or in the event of a transducer failure, the start is terminated. The recovery time of the battery 2 to return to the nominal voltage of 12 volts is 20 ms with a switching time of less than 1 μs in this exemplary embodiment. The maximum time below a voltage of 11 volts is less than 20 ms. This time can be supported in the vehicle systems.

Figure 2:
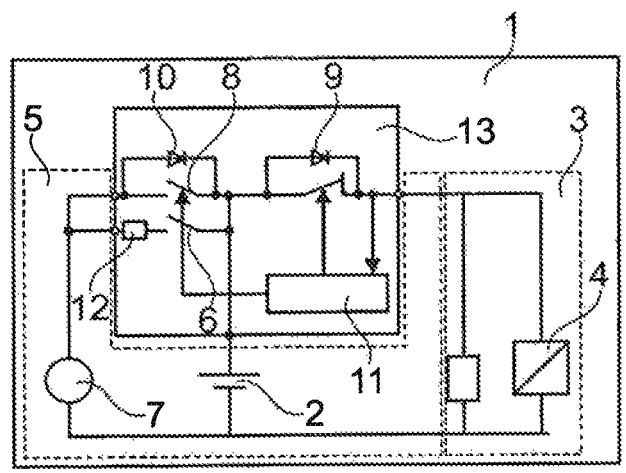
FIG. 2 illustrates an integrated starter and on-board electrical system disconnecting module according to a second exemplary embodiment of the invention.

FIG. 2 shows the module 13 according to a second exemplary embodiment of the invention. FIG. 2 differs from FIG. 1 by a control unit 11 further being provided which controls the first quasi-diode 9 and a second quasi-diode 10, wherein the two quasi-diodes 9, 10 are switched in series. In the event of falling below an on-board electrical system voltage limit, the control unit 11 switches through the quasi-diode 9 and terminates the start. By means of a corresponding software control device, a diagnosis and a status report take place in this second exemplary embodiment. Furthermore, the current usage of the two quasi-diodes 9, 10 is minimized by a corresponding controller, wherein the starter switch 6 and the on-board electrical system disconnecting switch 8 are formed as MOSFETs with intrinsic diodes. The whole system 1 of FIG. 2 thus differs from that of FIG. 1, in particular in the module 13.

Figure 3:
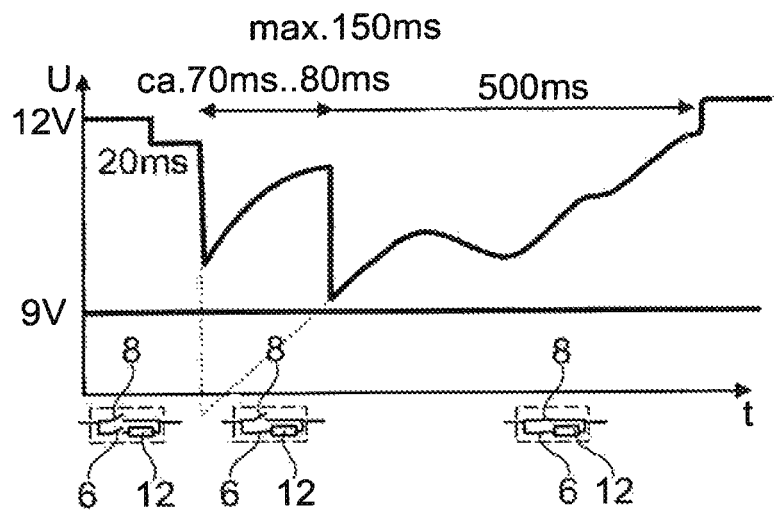
FIG. 3 is a schematic depiction of the limitation of the start voltage failure with series resistor according to a third exemplary embodiment.

FIG. 3 illustrates a limitation of the voltage drop with series resistors according to a third exemplary embodiment of the invention. Here, the voltage is applied to the on-board electrical system 3 via the time axis. When the two switches 6, 8 are open, the series resistor 12 is in neutral and the starter wire is potential-free. If the voltage drops below 11 volts in a time of 20 ms, the starter switch 6 is closed, such that the series resistor 12 is switched in series with the quasi-diode 9. The series resistor 12 is 8.5 mΩ and is switched on until the on-board electrical system voltage remains safely above 9 V. Within a time of between 70 ms and 80 ms, wherein, in this third exemplary embodiment, the maximum time is 150 ms, the voltage increases again virtually exponentially, before the on-board electrical system disconnecting switch 8 is also closed and thus the series resistor 12 is bridged and the whole current flows. Then, a further voltage drop to virtually 9 volts takes place, wherein thereafter, the voltage continuously increases again until the nominal voltage is reached again, and the starter wire becomes potential-free. The start duration is 500 ms in this third exemplary embodiment.

Figure 4:
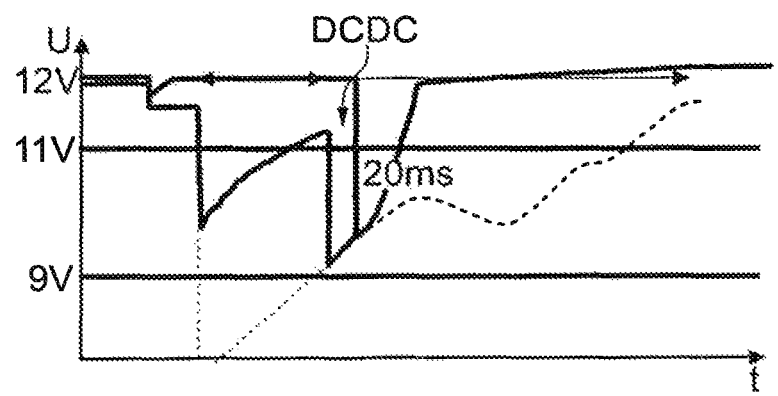
FIG. 4 illustrates an on-board electrical system disconnector and a start termination and an on-board electrical system support in the event of transducer failure according to a fourth exemplary embodiment of the invention.

FIG. 4 illustrates the on-board electrical system disconnector, a quick start termination and an on-board electrical system support in the event of transducer failure according to a fourth preferred exemplary embodiment. The transducer failure takes place where there is an arrow with the label DCDC in FIG. 4. Before this, the transducer supplies the on-board electrical system 3, and the quasi-diode 9 is closed and disconnects the starter circuit 5 from the on-board electrical system 3. After this, the quasi-diode 9 is switched and the starter battery 2 supplies the on-board electrical system 3. Furthermore, the diode function of the on-board electrical system disconnecting switch 8 is applied in a dashed manner in this diagram, wherein the voltage drop is applied over time. In the last section, the battery voltage recovers to a resulting load voltage within 15 ms.

Figure 5:
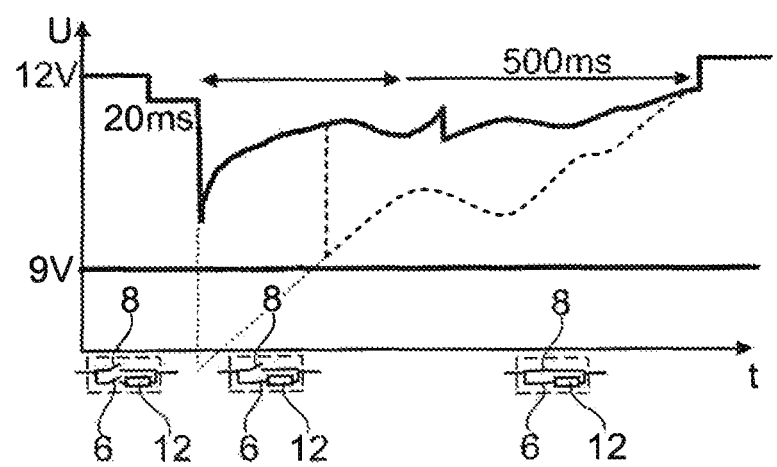
FIG. 5 illustrates a starter protection device with low-Ohm battery according to a fifth exemplary embodiment of the invention.

FIG. 5 illustrates the starter protection device with a low-Ohm battery according to a fifth exemplary embodiment of the invention. FIG. 5 does not differ at all from FIG. 3 in terms of the three time sections, yet in this fifth exemplary embodiment, a lithium starter battery is used and, at the end of the first time section, this low-Ohm battery is recognized. As a result, the resistor remains switched until the resistor becomes too hot. Furthermore, the course between the second and the third time section differs, such that, in FIG. 5, there is no abrupt voltage drop to be seen at the end of the second time section. During the second time section, the current switches through and an emergency switching can take place in the event of exceeding the temperature limit of the resistor.

The invention claimed is:
1. A module for connecting to only one starter battery and to an on-board electrical system by a transducer, comprising:
   a starter control device and an on-board electrical system disconnector, wherein the transducer is connected to a starter circuit including the only one starter battery from an on-board electrical system side via the starter control device and via the on-board electrical system disconnector;
   wherein the on-board electrical system is uncoupled from the starter circuit during a starting process and wherein the starter control device and the on-board electrical system disconnector are integrated in the module;
   a first quasi-diode disposed between the on-board electrical system side and the starter control device, wherein the first quasi-diode is closed in a base state, wherein, during a starting process, the first quasi-diode is open and a voltage of the on-board electrical system is monitored, and wherein the first quasi-diode is closed and the starting process is terminated in an event of a voltage falling below a predetermined level on the on-board electrical system side or in an event of a failure of the transducer during the starting process;
   wherein the starter control device comprises a starter switch that switches on a starter motor;
   a second quasi-diode that is switched in series with the first quasi-diode and that is parallel to the starter switch and wherein a voltage support point is provided between the first quasi-diode and the second quasi-diode; and
   a series resistor that is connected in series with the starter switch.
2. The module according to claim 1, wherein the on-board electrical system disconnector comprises an on-board electrical system disconnecting switch.
3. The module according to claim 1:
   wherein the starter motor is electrically coupled to the only one starter battery such that the starter motor and the only one starter battery can be disconnected from the on-board electrical system during a starting process;
   wherein the series resistor can be electrically connected to the first quasi-diode from a starter circuit side.

* * * * *